(12) United States Patent
Khan et al.

(10) Patent No.: US 11,905,480 B1
(45) Date of Patent: Feb. 20, 2024

(54) ENHANCING H₂S SPECIFICATION IN NGL PRODUCTS

(71) Applicant: SAUDI ARABIAN OIL COMPANY, Dhahran (SA)

(72) Inventors: Ashiff Khan, Khurais (SA); Hatem Bajuaifer, Jeddah (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/048,299

(22) Filed: Oct. 20, 2022

(51) Int. Cl.
*C10L 3/10* (2006.01)
*B01D 19/00* (2006.01)
*C10G 31/00* (2006.01)

(52) U.S. Cl.
CPC .......... *C10L 3/103* (2013.01); *B01D 19/0005* (2013.01); *B01D 19/0036* (2013.01); *C10G 31/00* (2013.01); *C10G 2300/1025* (2013.01); *C10G 2300/207* (2013.01); *C10G 2300/4081* (2013.01); *C10G 2400/28* (2013.01); *C10L 2290/10* (2013.01); *C10L 2290/545* (2013.01)

(58) Field of Classification Search
CPC ................. C10L 3/103; C10L 2290/10; C10L 2290/545; B01D 19/0005; B01D 19/0036; C10G 31/00; C10G 2300/1025; C10G 2300/207; C10G 2300/4081; C10G 2400/28
See application file for complete search history.

(56) References Cited

U.S. PATENT DOCUMENTS

| 5,992,175 A | 11/1999 | Yao et al. |
| 9,631,864 B2 | 4/2017 | Chen et al. |

FOREIGN PATENT DOCUMENTS

| CN | 111018021 A | 4/2020 |
| WO | 1997036139 A1 | 10/1997 |

*Primary Examiner* — Thuan D Dang
(74) *Attorney, Agent, or Firm* — Vorys, Sater, Seymour and Pease LLP

(57) ABSTRACT

The present disclosure relates a system, including: a stripping column configured to separate hydrogen sulfide from natural gas liquids (NGL), the following fluidly connected to the stripping column: a first condensate input line, a second condensate input line, a condensate stripper feed line, a feed drum, an overhead gas product line, a bottoms product NGL line, a slip stream NGL line, a reboiler return line, and an external stripping gas line, wherein a portion of the slip stream NGL line is combined with the external stripping gas line and fed to the stripping column in a stripping gas feed line that is fluidly connected to the stripping column.

9 Claims, 2 Drawing Sheets

ENHANCING H₂S SPECIFICATION IN NGL PRODUCTS

FIELD OF THE DISCLOSURE

The present disclosure relates generally to operation of hydrocarbon refining and processing facilities and, more particularly, to facilities which process natural gas or natural gas liquids.

BACKGROUND OF THE DISCLOSURE

Raw natural gas from a well is not suitable for use by consumers or commercial customers because it requires separation into constituent products. Various commercial processes have been developed for separation of natural gas into gaseous product as well as into condensate comprising natural gas liquids ("NGL" or "NGLs") which may include a blend of ethane, propane, butane, and pentane. NGLs can be further used as feedstock in commercial petrochemical operations, as well as in specialty chemicals production and plastic polymer production. NGLs may also be sold directly to consumers for use as heating and general purpose fuel.

Condensate stripper columns are typically employed in natural gas liquid processing plants, where NGLs are fractioned into their base components to capture high purity products. NGLs are components of natural gas (methane) that are separated from the gas state in the form of liquids. NGLs are valuable as separate products, and it is profitable to remove NGLs from the natural gas. The liquids are first extracted from the natural gas and later fractionated into different components. Generally, NGL refers to ethane, propane, butane, isobutane, pentane, and a minor portion may include molecules heavier than pentane (C5+). The NGLs can be fractioned by heating an NGL feed stream through one or more distillation columns that leverage the differing boiling points of the various hydrocarbon components to execute the fractionation. As the feed stream is heated in the distillation column, the hydrocarbon component having the lowest boiling point is first to boil off and be captured as overhead vapor, which can be condensed and/or otherwise routed to product storage. In some instances, the overhead vapor can be condensed into a reflux stream, which can be re-introduced into the top of the distillation column.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

A nonlimiting system according to the present disclosure may comprise: a stripping column configured to separate hydrogen sulfide from natural gas liquids (NGL), the following fluidly connected to the stripping column: a first condensate input line, a second condensate input line, a condensate stripper feed line, a feed drum, an overhead gas product line, a bottoms product NGL line, a slip stream NGL line, a reboiler return line, and an external stripping gas line, wherein a portion of the slip stream NGL line is combined with the external stripping gas line and fed to the stripping column in a stripping gas feed line that is fluidly connected to the stripping column.

A nonlimiting method according to the present disclosure may comprise: separating hydrogen sulfide from NGL in a stripping column, the following fluidly connected to the stripping column: a first condensate input line, a second condensate input line, a condensate stripper feed line, a feed drum, an overhead gas product line, a bottoms product NGL line, a slip stream NGL line, a reboiler return line, and an external stripping gas line; and feeding, to the stripping column in a stripping gas feed line fluidly connected to the stripping column, a portion of the slip stream NGL line in combination with the external stripping gas line.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
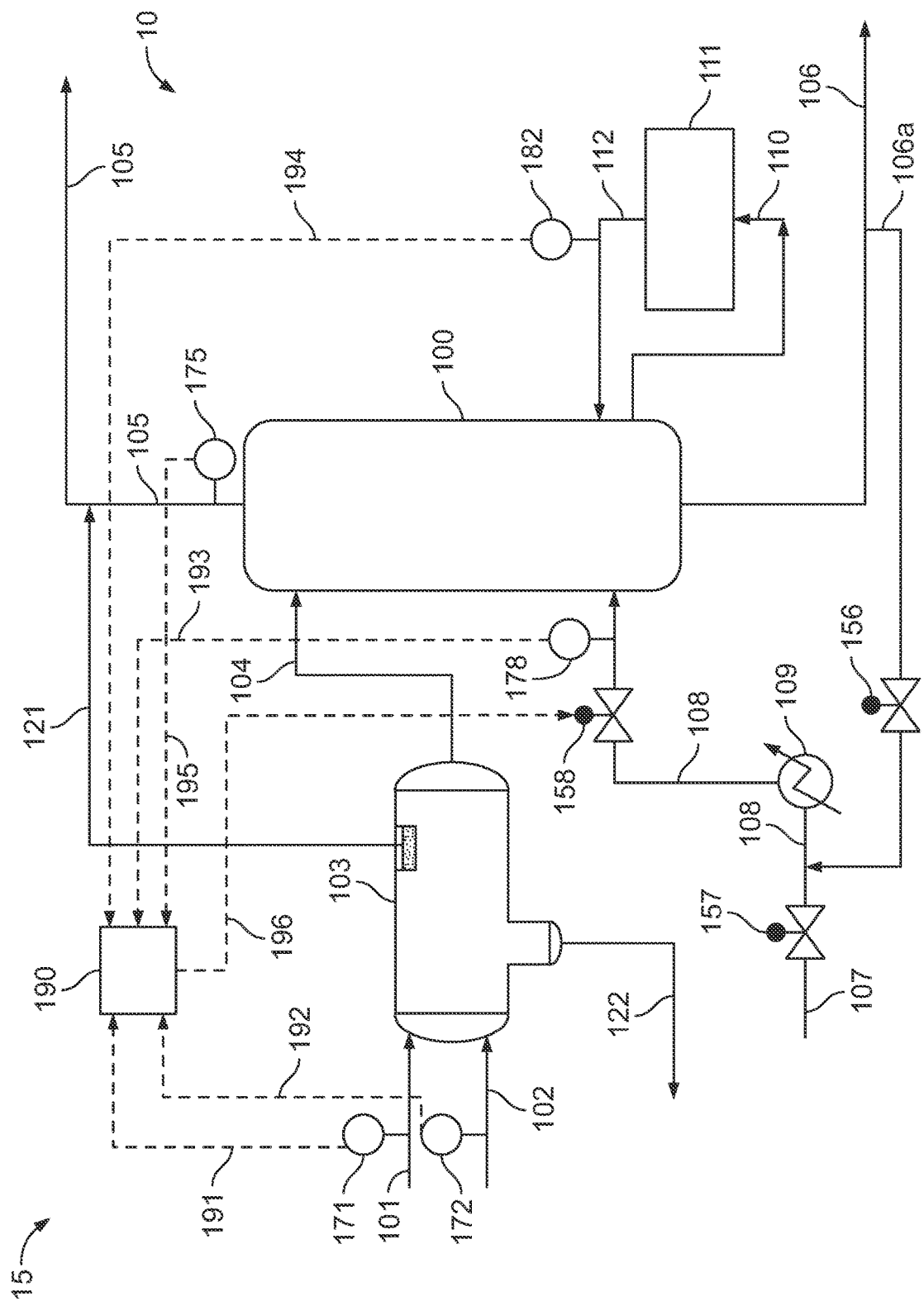
FIG. 1 is a system for natural gas liquids separation in accordance with the present disclosure.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to operation of hydrocarbon refining and processing facilities and, more particularly, to facilities which process natural gas or natural gas liquids (NGL).

In particular, embodiments in accordance with the present disclosure relate to methods of controlling and optimizing an NGL stripping column system in order to reduce hydrogen sulfide ($H_2S$) content in the product stream. The NGL stripping column of the present disclosure may be used to separate off $H_2S$ and/or lighter ends from NGL condensate in order to meet product specifications for NGL. The control system(s) described in the present disclosure allow for the ensured maintenance of output product specifications if feed conditions change or any temperature fluctuations in the reboiler occur. Maintaining product specifications may reduce or eliminate costs associated with reprocessing off-spec product. It may also improve environmental performance by reducing processing needs.

Referring to FIG. 1, an embodiment in accordance with the present disclosure may have a system 10 comprising a stripping column 100 configured to separate $H_2S$ and/or lighter ends from NGL.

The stripping column 100 may operate at any suitable temperature and pressure range known in the art for stripping columns. Preferably, the column may operate wherein the overhead pressure of the column is from about 0 psig to about 400 psig (or about 0 psig to about 200 psig, or about 200 psig to about 400 psig, or about 200 psig to about 300 psig, or about 250 psig to about 300 psig, or more preferably about 250 psig to about 270 psig), the reboiler outlet temperature is from about 50° F. to about 900° F. (or about 50° F. to about 500° F., or about 400° F. to about 900° F., or about 100° F. to about 500° F., or about 100° F. to about 300° F., or about 100° F. to about 250° F., or about 180° F. to about 210° F., or more preferably about 190° F. to about 205° F.), and the bottom tray temperature is from about 50° F. to about 900° F. (or about 50° F. to about 500° F., or about 400° F. to about 900° F., or about 100° F. to about 500° F., or about 100° F. to about 300° F., or about 100° F. to about 250° F., or about 150° F. to about 220° F., or more preferably about 170° F. to about 205° F.).

The stripping column 100 may operate at any suitable column feed quantity and will be well known by one of skill in the art.

The system 10 may have, a first condensate input line 101 configured to flow condensate feed from a source to a feed drum 103. Preferably the system may further comprise a second condensate input line 102. The source of the condensate input to lines 101 and 102 may include a gas-oil separation plant, a natural gas liquefaction train, or any other suitable source of NGLs condensate. The condensate input composition may comprise hydrocarbons which may include, but are not limited to, any combination of: heavy hydrocarbons (i.e. hydrocarbons with 7 carbons or greater), propane, butane, isobutene, pentane, and ethane. The condensate input composition may further comprise impurities which may include, but are not limited to, any combination of: carbon dioxide ($CO_2$), benzene, toluene, xylene, thiols. The condensate input may further comprise the impurity hydrogen sulfide ($H_2S$), moisture, or lighter ends. The condensate input may comprise a liquid, a gas, or a mixture thereof.

Preferably, the first condensate input line 101 may comprise heavy natural gas condensate and may originate from a gas oil separation plant. Also preferably, the second condensate input line 102 may comprise light natural gas condensate and may originate from a gas train.

The feed drum 103 may operate at a temperature and pressure to serve as a flashing unit, which may create multiple phases including a liquid condensate phase and a gaseous phase.

The feed drum 103 may further have, fluidly connected to it, a feed drum gas line 121 configured to carry a portion of the gas outflow of the feed drum 103, and a feed drum condensate line 122 configured to carry a portion of the condensate (liquid) outflow of the feed drum 103.

The system 10 may further have, fluidly connected to the stripping column 100, a condensate stripper feed line 104 (i.e. the feed to the stripping column) which connects the feed drum 103 the stripping column 100. The system may also further have, connected to the stripping column 100, an overhead gas product line 105.

The overhead gas product line 105 may be fluidly connected to the feed drum gas line 121, such that feed drum gas line 121 is combined with the overhead gas product line 105 to be fed to downstream compressors (not shown).

The system 10 may further comprise a bottoms product NGL line 106 that exits stripping column 100. A portion of bottoms product NGL line 106 may be directed from that line into slip stream NGL line 106a—material sent through line 106a may be considered an internal stripping gas. System 10 further comprises an external stripping gas line 107. Either slip stream NGL line 106a or external stripping gas line 107 may be present as a liquid, a gas, or any combination thereof. The external stripping gas line 107 may comprise an external stripping gas that may comprise any combination of: propane, butane, isobutene, pentane, ethane, nitrogen, or methane. The external stripping gas may be selected based on lab experimentation or computer simulation. In embodiments where a portion of bottoms product NGL line 106 is sent to slip stream NGL line 106a, slip stream NGL line 106a may be combined with external stripping gas line 107 to form a stripping gas feed line 108 which acts as a stripping gas in stripping column 100. In the system 10, the stripping gas fed to stripping column 100 though stripping gas feed line 108 may comprise only external stripping gas (via 107), only internal stripping gas (via 106a), or a combination of both external and internal stripping gas.

The system 10 may further comprise, fluidly connected to the stripping column, a reboiler feed line 110, a reboiler 111, and a reboiler return line 112.

Stripping gas feed line 108 passes through a heat exchanger 109. The heat exchanger 109 is configured to heat and/or vaporize the stripping gas which passes through the stripping gas feed line 108. The heat exchanger 109 may be configured to heat the stripping gas to a temperature that is within 20% (or 10%, or 25%, or 30%, or 50%) of the temperature of a stripping gas feed tray, i.e., the tray at which or below which the stripping gas enters the stripping column 100 (e.g., if the stripping gas feed tray is the bottom tray, the system may be configured such that the stripping gas enters at the bottom tray or any location of the stripping column below the bottom tray). The heat exchanger 109 may use any suitable heating medium to heat and/or vaporize the stripping gas, including, but not limited to, electric heating, steam heating, or residual process heat.

Preferably, the stripping gas feed tray may be located within the bottom 5 trays of the stripping column, including: the bottom tray, the second from bottom tray, the third from bottom tray, the fourth from bottom tray, and the fifth from bottom tray.

The system 10 may further comprise a control system 15 which may comprise a stripping gas control valve 158 on the stripping gas feed line 108.

The control system 15 may further comprise a stripping gas flow indicator 178 on the stripping gas feed line 108 configured to measure a flow of a stripping gas which has passed through the stripping gas control valve 158.

The control system 15 may further comprise a first condensate input line flow indicator 171 on the first condensate input line 101, wherein the first condensate input line flow indicator 171 is configured to measure a first condensate flow through the first condensate input line 101, and preferably the control system 15 may also further comprise a second condensate input line flow indicator 172 on the second condensate input line 102, wherein the second condensate input line flow indicator 172 is configured to measure a second condensate flow through the second condensate input line 102.

The control system 15 may further comprise a reboiler thermocouple 182 connected to the reboiler return line 112 and configured to measure a reboiler return temperature.

The control system 15 may further comprise an overhead thermocouple 175 connected to the overhead gas product line 105 and configured to measure an overhead gas temperature.

The control system 15 may further comprise a ratio controller 190. The ratio controller may be configured to receive electronic signals from sensors including, but not limited to, thermocouples, flow indicators, pressure transducers, and the like. The ratio controller 190 may be configured to send electronic signals to equipment including electric motor controllers, valve actuators, and the like. The signals of the ratio controller 190 may be sent over wired means, wireless means, or any combination thereof. The ratio controller 190 may be configured to receive a first signal 191 from the first condensate input line flow indicator 171. Preferably, the system may also be such that the ratio controller 190 is configured to receive a second signal 192 from the second condensate input line flow indicator 172. The system may also be configured such that the ratio controller 190 receives a third signal 193 from the stripping gas flow indicator 178 and a fourth signal 194 from the reboiler thermocouple 182. The system may also be configured such that the ratio controller 190 receives a fifth signal 195 from the overhead thermocouple 175.

The ratio controller 190 may be configured to perform calculation(s) based on input signals. The ratio controller 190 may be configured to calculate an active feed ratio and to calculate a ratio difference between the active feed ratio and an optimal feed ratio. The active feed ratio may be calculated by dividing the first condensate flow by the second condensate flow. The ratio controller may send a sixth signal 196 to stripping gas control valve 158 based on the ratio difference.

The control system 15 may further comprise a first auxiliary valve 156 on slip stream NGL line 106*a* and a second auxiliary valve 157 on the external stripping gas line 107. The first auxiliary valve 156 and the second auxiliary valve 157 may be configured to operate by manual or automated means.

Figure 2:
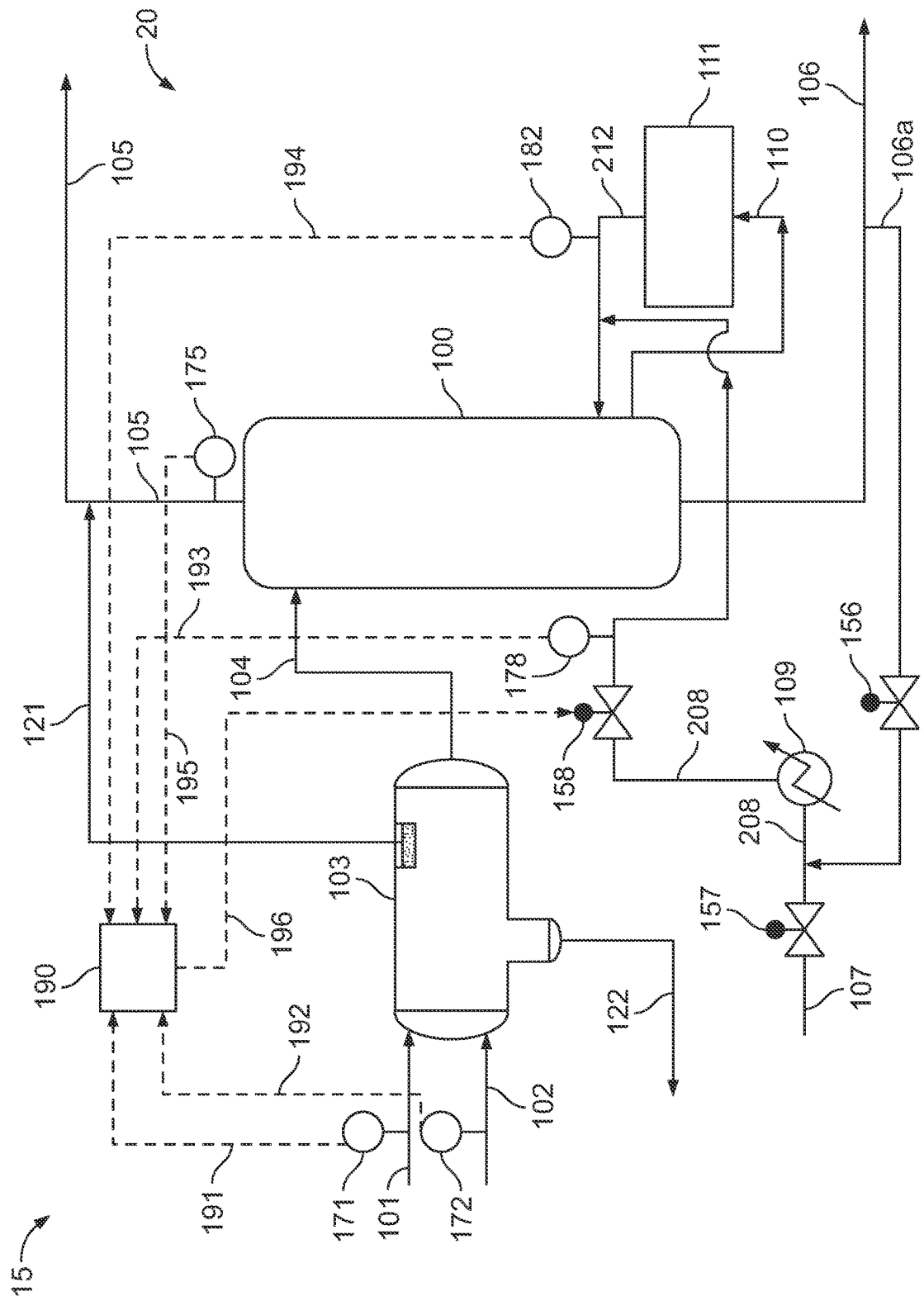
FIG. 2 is an alternate system for natural gas liquids separation in accordance with the present disclosure.

An alternate embodiment comprising system 20 is displayed in FIG. 2 with continued reference to FIG. 1. The system 20 may further comprise a stripping gas feed line 208 which comprises stripping gas. The stripping gas feed line 208 may be fluidly connected to a reboiler return line 212, resulting in the stripping gas mixing with the contents of the reboiler return line 212. The reboiler return line 212 may be fluidly connected to the stripping column 100.

The present disclosure additionally includes a method of separating $H_2S$ from NGL by utilizing the stripping column 100 of a system 10.

The method may utilize a system which may have, fluidly connected to the stripping column 100 used for separating $H_2S$ from NGL, a first condensate input line 101 configured to flow condensate feed from a source to a feed drum 103. Preferably, the method may further comprise a second condensate input line 102. The source of the condensate input to lines 101 and 102 may include a gas-oil separation plant, a natural gas liquefaction train, or any other suitable source of NGLs condensate. The condensate input composition may comprise hydrocarbons which may include, but are not limited to, any combination of: heavier hydrocarbons (i.e., hydrocarbons with 7 carbons or greater), propane, butane, isobutene, pentane, and ethane. The condensate input composition may further comprise impurities which may include, but are not limited to, any combination of: carbon dioxide ($CO_2$), benzene, toluene, xylene, thiols. The condensate input may further comprise the impurity $H_2S$), moisture, or lighter ends. The condensate input may comprise a liquid, a gas, or a mixture thereof.

Preferably, the first condensate input line 101 may comprise heavy condensate and may originate from a gas oil separation plant. Also preferably, the second condensate input line 102 may comprise light condensate and may originate from a natural gas liquefaction train.

Furthermore, the method may be such that the feed drum 103 operates at a temperature and pressure such that the feed drum 103 serves as a flashing unit, which may create multiple phases including a liquid condensate phase and a gaseous phase.

The method may further include providing, fluidly connected to the feed drum 103, a feed drum gas line 121 configured to carry a portion of the gas outflow of the feed drum 103, and a feed drum condensate line 122 configured to carry a portion of the condensate (liquid) outflow of the feed drum 103.

The method may further provide, fluidly connected to the stripping column 100, a condensate stripper feed line 104 (i.e., the feed to the stripping column) which may connect the feed drum 103 to the stripping column 100. The method may also provide, fluidly connected to the stripping column 100, an overhead gas product line 105.

The overhead gas product line 105 may be fluidly connected to the feed drum gas line 121, such that feed drum gas line 121 is combined with the overhead gas product line 105 to be fed to downstream compressors (not shown).

The method may further provide a bottoms product NGL line 106 that exits stripping column 100. A portion of bottoms product NGL line 106 may be directed from that line into slip stream NGL line 106*a*—material sent through line 106*a* may be considered an internal stripping gas. The method may further provide an external stripping gas line 107. Either slip stream NGL line 106*a* or external stripping gas line 107 may be present as a liquid, a gas, or any combination thereof. The external stripping gas line 107 comprises an external stripping gas that may comprise any combination of: propane, butane, isobutene, pentane, ethane, nitrogen, or methane. The external stripping gas may be selected based on lab experimentation or computer simulation. In embodiments where a portion of bottoms product NGL line 106 is sent to slip stream NGL line 106*a*, slip stream NGL line 106*a* may be combined with external stripping gas line 107 to form a stripping gas feed line 108 which acts as a stripping gas in stripping column 100. As part of the method, the stripping gas fed to stripping column 100 though stripping gas feed line 108 may comprise only external stripping gas (via 107), only internal stripping gas (via 106*a*), or a combination of both external and internal stripping gas.

The method may further provide, fluidly connected to the stripping column 100, a reboiler feed line 110, a reboiler 111, and a reboiler return line 112.

The method may further comprise vaporizing a portion of the stripping gas feed line 108 by utilizing a heat exchanger 109. The method may further comprise heating, by utilizing the heat exchanger 109, the stripping gas to a temperature that is within 20% (or 10%, or 25%, or 30%, or 50%) of the temperature of a stripping gas feed tray, i.e., the tray at which or below which the stripping gas enters the stripping column 100 (e.g., if the stripping gas feed tray is the bottom tray, the system may be configured such that the stripping gas enters at the bottom tray or any location of the stripping column below the bottom tray). The vaporizer 109 may use any suitable heating medium to heat and/or vaporize the stripping gas, including, but not limited to, electric heating, steam heating, or residual process heat.

Preferably, the method may be such that the stripping gas feed tray may be located within the bottom 5 trays of the stripping column, including: the bottom tray, the second from bottom tray, the third from bottom tray, the fourth from bottom tray, and the fifth from bottom tray.

The method may further comprise a control method utilizing control system 15. The control method may comprise providing a stripping gas control valve 158 on the stripping gas feed line 108.

The control method may further comprise measuring a flow of stripping gas which has passed through the stripping gas control valve 158 by utilizing a stripping gas flow indicator 178 on the stripping gas feed line 108.

The control method may further comprise measuring a first condensate flow through the first condensate input line 101 by utilizing a first condensate input line flow indicator 171 on the first condensate input line 101, and preferably may also further comprise measuring a second condensate flow through the second condensate input line 102a by utilizing a second condensate input line flow indicator 172 on the second condensate input line 102.

The control method may further comprise measuring a reboiler return temperature by utilizing a reboiler thermocouple 182 connected to the reboiler return line 112 of the stripping column 100.

The control method may further comprise measuring an overhead gas temperature by utilizing an overhead thermocouple 175 connected to the overhead gas product line 105.

The control method may further comprise receiving one or more signals to a ratio controller 190. The ratio controller 190 may be configured to receive electronic signals from sensors including, but not limited to, thermocouples, flow indicators, pressure transducers, and the like. The ratio controller 190 may be configured to send electronic signals to equipment including electric motor controllers, valve actuators, and the like. The signals of the ratio controller 190 may be sent over wired means, wireless means, or any combination thereof. The control method may further comprise receiving, by the ratio controller 190, a first signal 191 from the first condensate input line flow indicator 171. The control method may further comprise receiving, by the ratio controller 190, a second signal 192 from the second condensate input line flow indicator 172. The control method may further comprise receiving, by the ratio controller 190, a third signal 193 from the stripping gas flow indicator 178 and a fourth signal 194 from the reboiler thermocouple 182. The control method may further comprise receiving, by the ratio controller 190, a fifth signal 195 from the overhead thermocouple 175.

The control method may comprise calculating a value based on input signals. The control method may further comprise, by utilizing the ratio controller 190, calculating a ratio difference between an active feed ratio and an optimal feed ratio. The active feed ratio may be calculated by dividing the first condensate flow by the second condensate flow. The control method may further comprise sending, by utilizing the ratio controller 190, a sixth signal 196 to the stripping gas control valve based on the ratio difference.

The control method may further comprise providing a first auxiliary valve 156 on the slip stream NGL line 106a and a second auxiliary valve 157 on the external stripping gas line 107. The first auxiliary valve 156 and the second auxiliary valve 157 may be configured to operate by manual or automated means.

For the purpose of these simplified schematic illustrations and description, there may be additional valves, actuators, pumps, temperature sensors, electronic controllers, heat exchangers and the like that are customarily employed in hydrocarbon processing operations and that are well known to those of ordinary skill in the art which are not shown.

Embodiments disclosed herein include:

Embodiment 1. A system, comprising: a stripping column configured to separate hydrogen sulfide from natural gas liquids (NGL), the following fluidly connected to the stripping column: a first condensate input line, a second condensate input line, a condensate stripper feed line, a feed drum, an overhead gas product line, a bottoms product NGL line, a slip stream NGL line, a reboiler return line, and an external stripping gas line, wherein a portion of the slip stream NGL line is combined with the external stripping gas line and fed to the stripping column in a stripping gas feed line that is fluidly connected to the stripping column.

Embodiment 2. The system of Embodiment 1, further comprising: a stripping gas control valve on the stripping gas feed line; a stripping gas flow indicator on the stripping gas feed line configured to measure a flow of a stripping gas which has passed through the stripping gas control valve; a first condensate input line flow indicator on the first condensate input line, wherein the first condensate input line flow indicator is configured to measure a first condensate flow through the first condensate input line; a second condensate input line flow indicator on the second condensate input line, wherein the second condensate input line flow indicator is configured to measure a second condensate flow through the second condensate input line; a reboiler thermocouple connected to the reboiler return line of the stripping column; an overhead thermocouple connected to the overhead gas product line; and a ratio controller, wherein the ratio controller is configured to receive a first signal from the first condensate input line flow indicator, a second signal from the second condensate input line flow indicator, a third signal from the stripping gas flow indicator, a fourth signal from the reboiler thermocouple, and a fifth signal from the overhead thermocouple.

Embodiment 3. The system of any one of Embodiments 1-2, wherein the ratio controller calculates an active feed ratio, calculates a ratio difference between the active feed ratio and an optimal feed ratio, and sends a sixth signal to the stripping gas control valve based on the ratio difference.

Embodiment 4. The system of any one of Embodiments 1-3, further comprising: a stripping feed tray of the stripping column fluidly connected to the stripping gas feed line.

Embodiment 5. The system of any one of Embodiments 1-4, wherein the stripping feed tray is a bottom tray of the stripping column, or wherein the stripping feed tray is a second from bottom tray of the stripping column.

Embodiment 6. The system of any one of Embodiments 1-4, further comprising: a stripping feed tray temperature of the stripping feed tray.

Embodiment 7. The system of any one of Embodiments 1-6, further comprising: a heat exchanger; wherein the heat exchanger is configured to vaporize a portion of the stripping gas in the stripping gas feed line; and/or wherein the heat exchanger is configured to heat a portion of the stripping gas in the stripping gas feed line to a stripping feed temperature that is within 20% of the stripping feed tray temperature.

Embodiment 8. The system of any one of Embodiments 1-7, further comprising: a feed drum gas line configured to carry a gas of the feed drum; and a feed drum condensate line configured to carry a condensate of the feed drum.

Embodiment 9. The system of any one of Embodiments 1-8, further comprising: a first auxiliary valve on the slip stream NGL line; and a second auxiliary valve on the external stripping gas line.

Embodiment 10. A separation method, the method comprising: separating hydrogen sulfide from natural gas liquids (NGL) in a stripping column, the following fluidly connected to the stripping column: a first condensate input line, a second condensate input line, a condensate stripper feed line, a feed drum, an overhead gas product line, a bottoms product NGL line, a slip stream NGL line, a reboiler return line, and an external stripping gas line; and feeding, to the stripping column in a stripping gas feed line fluidly connected to the stripping column, a portion of the slip stream NGL line in combination with the external stripping gas line.

Embodiment 11. The method of Embodiment 10, further comprising: providing a stripping gas control valve on the stripping gas feed line; measuring a flow of a stripping gas which has passed through the stripping gas control valve by utilizing a stripping gas flow indicator on the stripping gas feed line; measuring a first condensate flow by utilizing a first condensate input line flow indicator on the first condensate input line; measuring a second condensate flow by utilizing a second condensate input line flow indicator on the second condensate input line; measuring a reboiler return temperature by utilizing a reboiler thermocouple connected to the reboiler return line of the stripping column; measuring an overhead gas temperature by utilizing an overhead thermocouple connected to the overhead gas product line; and receiving, by a ratio controller, a first signal from the first condensate input line flow indicator, a second signal from the second condensate input line flow indicator, a third signal from the stripping gas flow indicator, a fourth signal from the reboiler thermocouple, and a fifth signal from the overhead thermocouple.

Embodiment 12. The method of any one of Embodiments 10-11, further comprising: calculating, by utilizing the ratio controller, a ratio difference between an active feed ratio and an optimal feed ratio; and sending, by utilizing the ratio controller, a sixth signal to the stripping gas control valve based on the ratio difference.

Embodiment 13. The method of any one of Embodiments 10-12, wherein the stripping column has a stripping feed tray, and wherein the stripping feed tray is fluidly connected to the stripping gas feed line.

Embodiment 14. The method of any one of Embodiments 10-13, wherein the stripping feed tray is a bottom tray of the stripping column, or wherein the stripping feed tray is a second from bottom tray of the stripping column.

Embodiment 15. The method of any one of Embodiments 10-14, wherein the stripping feed tray has a stripping feed tray temperature.

Embodiment 16. The method of any one of Embodiments 10-15, further comprising providing a heat exchanger and: vaporizing, utilizing the heat exchanger, a portion of the stripping gas in the stripping gas feed line; and/or heating, utilizing the heat exchanger, a portion of the stripping gas in the stripping gas feed line to a stripping feed temperature that is within 20% of the stripping feed tray temperature.

Embodiment 17. The method of any one of Embodiments 10-16, further comprising: providing a feed drum gas line configured to carry a gas of the feed drum; and providing a feed drum condensate line configured to carry a condensate of the feed drum.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains," "containing," "includes," "including," "comprises," and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, as used herein, the terms "coupled" or "coupled to" or "connected" or "connected to" or "attached" or "attached to" may indicate establishing either a direct or indirect connection, and are not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A system, comprising:
    a stripping column configured to separate hydrogen sulfide from natural gas liquids (NGL), the following fluidly connected to the stripping column:
        a first condensate input line,
        a second condensate input line,
        a condensate stripper feed line,
        a feed drum,
        an overhead gas product line,
        a bottoms product NGL line,
        a slip stream NGL line,
        a reboiler return line, and
        an external stripping gas line,
    wherein a portion of the slip stream NGL line is combined with the external stripping gas line and fed to the stripping column in a stripping gas feed line that is fluidly connected to the stripping column.

2. The system of claim 1, further comprising:
    a stripping gas control valve on the stripping gas feed line;

a stripping gas flow indicator on the stripping gas feed line configured to measure a flow of a stripping gas which has passed through the stripping gas control valve;

a first condensate input line flow indicator on the first condensate input line, wherein the first condensate input line flow indicator is configured to measure a first condensate flow through the first condensate input line;

a second condensate input line flow indicator on the second condensate input line, wherein the second condensate input line flow indicator is configured to measure a second condensate flow through the second condensate input line;

a reboiler thermocouple connected to the reboiler return line of the stripping column;

an overhead thermocouple connected to the overhead gas product line; and a ratio controller, wherein the ratio controller is configured to receive a first signal from the first condensate input line flow indicator, a second signal from the second condensate input line flow indicator, a third signal from the stripping gas flow indicator, a fourth signal from the reboiler thermocouple, and a fifth signal from the overhead thermocouple.

3. The system of claim 2, wherein the ratio controller calculates an active feed ratio, calculates a ratio difference between the active feed ratio and an optimal feed ratio, and sends a sixth signal to the stripping gas control valve based on the ratio difference.

4. The system of claim 1, further comprising:
a stripping feed tray of the stripping column fluidly connected to the stripping gas feed line.

5. The system of claim 4, wherein the stripping feed tray is a bottom tray of the stripping column, or wherein the stripping feed tray is a second from bottom tray of the stripping column.

6. The system of claim 4, further comprising:
a stripping feed tray temperature of the stripping feed tray.

7. The system of claim 6, further comprising:
a heat exchanger;
wherein the heat exchanger is configured to vaporize a portion of the stripping gas in the stripping gas feed line; and/or
wherein the heat exchanger is configured to heat a portion of the stripping gas in the stripping gas feed line to a stripping feed temperature that is within 20% of the stripping feed tray temperature.

8. The system of claim 1, further comprising:
a feed drum gas line configured to carry a gas of the feed drum; and
a feed drum condensate line configured to carry a condensate of the feed drum.

9. The system of claim 1, further comprising:
a first auxiliary valve on the slip stream NGL line; and
a second auxiliary valve on the external stripping gas line.

* * * * *